(12) United States Patent
Morelli et al.

(10) Patent No.: US 11,995,920 B2
(45) Date of Patent: May 28, 2024

(54) ENHANCED SENSOR HEALTH AND REGRESSION TESTING FOR VEHICLES

(71) Applicant: Argo AI, LLC, Pittsburgh, PA (US)

(72) Inventors: Michael V. Morelli, Cranbury, NJ (US); Laurens M. Schouten-Evers, San Francisco, CA (US); Alan William Yip, Detroit, MI (US); Duc H. Vu, Sunnyvale, CA (US); Koji L Gardiner, San Francisco, CA (US); Christopher N. St. John, Northville, MI (US); Eric K. Thong, Palo Alto, CA (US); Morgan M. Wagner, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 617 days.

(21) Appl. No.: 17/079,000

(22) Filed: Oct. 23, 2020

(65) Prior Publication Data

US 2022/0130185 A1 Apr. 28, 2022

(51) Int. Cl.
*G07C 5/08* (2006.01)
*B60W 50/02* (2012.01)
(Continued)

(52) U.S. Cl.
CPC ....... *G07C 5/0808* (2013.01); *B60W 50/0205* (2013.01); *G01S 7/497* (2013.01);
(Continued)

(58) Field of Classification Search
CPC ............ G07C 5/0808; B60W 50/0205; B60W 2420/42; B60W 2420/52; B60W 2420/54; G01S 7/497; G01S 17/931; H04N 7/185
See application file for complete search history.

(56) References Cited

U.S. PATENT DOCUMENTS 7,256,818 B2  8/2007 Sadok et al.
7,441,236 B2  10/2008 Chon et al.
(Continued)

FOREIGN PATENT DOCUMENTS

DE  10218228 A1  11/2003
DE  102016202805 A1  8/2017
(Continued)

OTHER PUBLICATIONS

International Search Report in corresponding international patent application No. PCT/US2021/05541, dated Jan. 28, 2022, 5 pages.
(Continued)

*Primary Examiner* — Peter D Nolan
*Assistant Examiner* — Anwar Mohamed

(57) ABSTRACT

Devices, systems, and methods are provided for sensor health and regression testing. A sensor testing system may include a first plurality of sensor testing targets positioned on a first side of a vehicle at a first distance from the vehicle, a second plurality of sensor testing targets positioned on a second side of the vehicle at the first distance, and a first sensor testing target positioned at a second distance from the vehicle, the second distance further from the vehicle than the first distance. The first and second pluralities of sensor testing targets both may include three or more sensor testing targets for testing cameras and light detection and ranging (LIDAR) sensors of the vehicle. The first sensor testing target may be used to test at least one of camera or LIDAR data. The sensor testing system may identify degradation of sensor performance, triggering further analysis and/or repairs.

18 Claims, 8 Drawing Sheets

(51) Int. Cl.
  *G01S 7/497* (2006.01)
  *G01S 17/931* (2020.01)
  *H04N 7/18* (2006.01)
  *B60W 60/00* (2020.01)

(52) U.S. Cl.
  CPC ........... *G01S 17/931* (2020.01); *H04N 7/185* (2013.01); *B60W 60/001* (2020.02); *B60W 2420/403* (2013.01); *B60W 2420/408* (2024.01); *B60W 2420/54* (2013.01)

(56) References Cited

U.S. PATENT DOCUMENTS

| | | | |
|---|---|---|---|
| 9,472,097 B2 | 10/2016 | Stelzig et al. | |
| 10,310,509 B1 | 6/2019 | Ferguson et al. | |
| 10,368,063 B2 | 7/2019 | Lehmann et al. | |
| 10,467,704 B1 | 11/2019 | Konrardy et al. | |
| 10,580,227 B2 | 3/2020 | Zhai | |
| 11,629,835 B2 * | 4/2023 | Kuffner, Jr. | G06T 7/90 362/466 |
| 2009/0087029 A1 | 4/2009 | Coleman et al. | |
| 2009/0299684 A1 | 12/2009 | Imanishi et al. | |
| 2014/0340570 A1 | 11/2014 | Meyers et al. | |
| 2017/0225680 A1* | 8/2017 | Huang | B60W 10/18 |
| 2017/0364095 A1 | 12/2017 | Wang et al. | |
| 2018/0075309 A1* | 3/2018 | Sathyanarayana | G05D 1/0055 |
| 2018/0284271 A1* | 10/2018 | Bogatscher | G02B 27/0955 |
| 2018/0297609 A1 | 10/2018 | Bozsik | |
| 2018/0366000 A1 | 12/2018 | Wendt et al. | |
| 2019/0179979 A1* | 6/2019 | Melick | G01P 21/02 |
| 2019/0204425 A1* | 7/2019 | Abari | G01S 7/497 |
| 2019/0266712 A1 | 8/2019 | Chirayath | |
| 2019/0351913 A1* | 11/2019 | Watanabe | G01S 17/42 |
| 2020/0039528 A1 | 2/2020 | Ewert | |
| 2020/0333447 A1* | 10/2020 | Cardei | G01S 17/10 |
| 2021/0097147 A1* | 4/2021 | DeVore | G06F 18/22 |
| 2021/0186006 A1* | 6/2021 | Sibley | G05D 1/0044 |
| 2021/0190922 A1* | 6/2021 | Yu | G01S 7/497 |
| 2021/0192788 A1* | 6/2021 | Diederichs | G06T 7/80 |
| 2021/0197854 A1* | 7/2021 | Grabe | G06V 20/588 |
| 2021/0199479 A1* | 7/2021 | Lau | G01D 18/008 |
| 2021/0208245 A1* | 7/2021 | Pandey | G01S 13/865 |
| 2021/0208263 A1* | 7/2021 | Sutavani | G01S 17/931 |
| 2021/0239793 A1* | 8/2021 | Yu | G01S 7/4026 |
| 2021/0278511 A1* | 9/2021 | Krishnan | G01S 13/931 |
| 2021/0286068 A1* | 9/2021 | Kumar | G01S 13/931 |
| 2021/0316669 A1* | 10/2021 | Wang | G01S 7/4086 |
| 2021/0318149 A1* | 10/2021 | Chang | G06T 7/85 |
| 2022/0073036 A1* | 3/2022 | Jackson, Jr. | G01S 7/40 |
| 2022/0118994 A1* | 4/2022 | Lu | G06T 7/85 |
| 2022/0326349 A1* | 10/2022 | Tone | G01M 17/0074 |

FOREIGN PATENT DOCUMENTS

| | | |
|---|---|---|
| EP | 1417512 B1 | 1/2019 |
| JP | 2006287789 A | 10/2006 |
| JP | 2018207458 A | 12/2018 |
| WO | 2004028134 A2 | 4/2004 |
| WO | 2014172031 A1 | 10/2014 |

OTHER PUBLICATIONS

Wang et al. "Prognostics of Automotive Sensors: Tools and Case Study", Proceedings of MFPT 62, Jan. 2008, pp. 1-18, ResearchGate, Berlin, Germany.

Miller, Christian K. "A Simulation and Regression Testing Framework for Autonomous Vehicles", Department of Electrical Engineering and Computer Science, Aug. 2007, pp. 1-119, Case Western Reserve University, Cleveland, OH.

Petit et al. "Remote Attacks on Automated Vehicles Sensors: Experiments on Camera and LiDAR", Computer Science, Mar. 4, 2019, pp. 1-13, Semantic Scholar, Seattle, Washington.

Rosnell et al. "Point Cloud Generation from Aerial Image Data Acquired by a Quadrocopter Type Micro Unmanned Aerial Vehicle and a Digital Still Camera", Sensors, Jan. 4, 2012, pp. 453-480, vol. 12, MDPI, Basel, Switzerland.

* cited by examiner

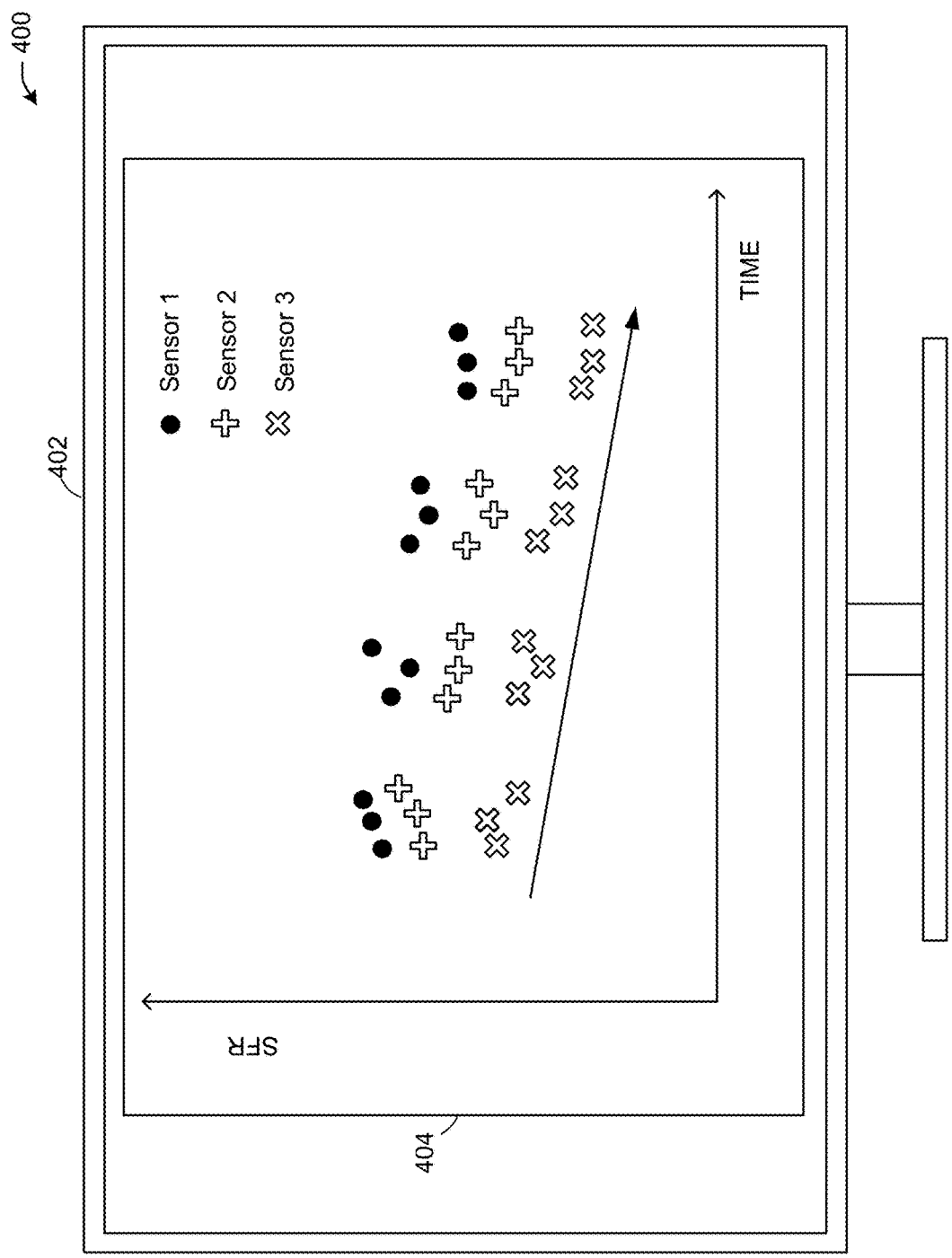

ENHANCED SENSOR HEALTH AND REGRESSION TESTING FOR VEHICLES

TECHNICAL FIELD

This disclosure generally relates to systems and methods for sensor testing.

BACKGROUND

Some vehicles are equipped with a sensor system to collect data relating to the current and developing state of the vehicle's surroundings. The proper performance of a vehicle depends on the accuracy data collected by the sensors in the sensor system. The sensor system may comprise radars, visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle.

However, sensor performance may degrade over time, undermining the experience of passengers of vehicles that use a sensor system.

BRIEF DESCRIPTION OF THE DRAWINGS

FIG. 4A depicts an illustrative example graphical output for sensor health and regression testing, in accordance with one or more example embodiments of the present disclosure.

Figure 1:
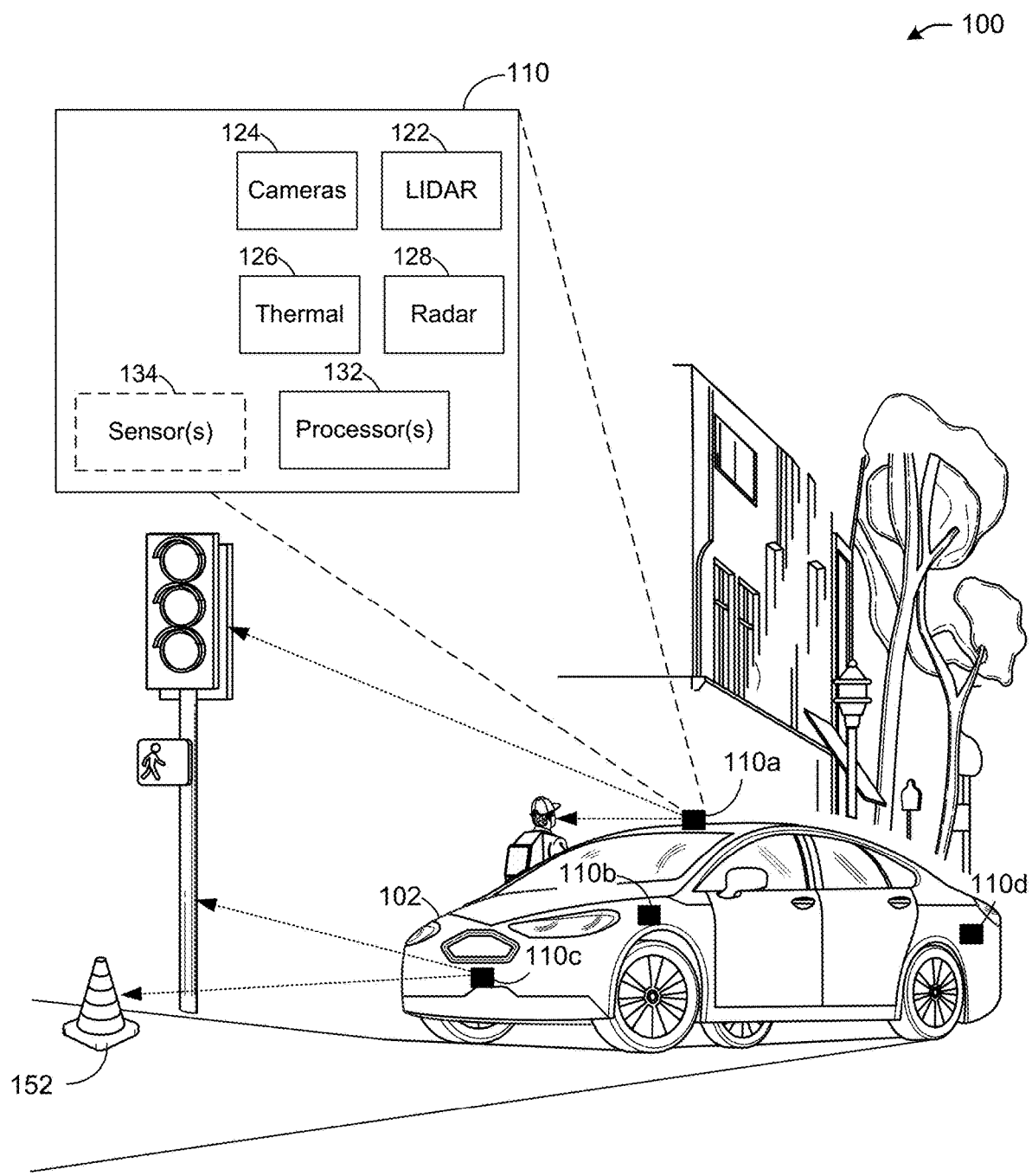
FIG. 1 illustrates example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Vehicle fleets, such as fleets of autonomous vehicles, may have sensor systems that use cameras, light detection and ranging (LIDAR), radar, and/or thermal sensors to detect objects and control vehicle operations. The sensors may be tested for performance standards before the vehicles are used in the field (e.g., to transport people). Once the vehicles are driving (e.g., in use), there may not be a way to monitor sensor performance over time. Because sensor performance may decline over time, if sensor performance is not tracked, vehicle operation may be impacted, and may undermine user experience. For example, sensor detection may control the acceleration and deceleration of a vehicle, so when a sensor detects the presence of an object, the vehicle may slow down and stop. A degraded sensor performance may result in "harder" deceleration (e.g., faster rate of deceleration) of the vehicle, which may be less comfortable for a vehicle passenger than a smoother (e.g., slower) deceleration.

Therefore, vehicles and vehicle passengers may benefit from proactive monitoring and predicting of sensor performance to identify possible future sensor degradation before the degradation may occur.

Example embodiments described herein provide certain systems, methods, and devices for a sensor testing.

In one or more embodiments, a vehicle sensor testing system may be established to test vehicle sensors, identify sensor data trends from sensor data of multiple vehicles, and predict when sensor degradation may occur for any vehicle. The sensor testing system may a vehicle depot location to where autonomous vehicles may drive and have vehicle sensors tested. For example, the sensor testing system may be a drive-through depot. As a vehicle drives through the depot, various scans and other tests may be performed on the vehicle sensors. The vehicle sensor tests may provide data indicative of the health of any sensor of any vehicle.

In one or more embodiments, the vehicle sensor testing system may identify when a sensor's data exhibits signs of possible degradation. For example, when a sensor's data does not satisfy one or more thresholds, and/or matches sensor data trends (e.g., based on a corpus of sensor data from one or more vehicles over time) that are indicative of possible degradation, the vehicle sensor testing system proactively may repair or replace sensors before sensor performance declines.

In one or more embodiments, the vehicle sensor testing system may allow a vehicle to drive into an area of the depot (e.g., a testing area) where sensor testing targets may be arranged around the vehicle at one or more distances from the vehicle (e.g., in a circle around the vehicle). The testing targets may allow for vehicle sensors using different modalities (e.g., camera, LIDAR, radar, thermal, etc.) to detect objects and their distances from the vehicle. For example, the vehicle sensor testing system may measure the spatial frequency response (SFR), dynamic range, and color accuracy of a vehicle camera, and may determine a perception-based image quality evaluator (PIQE) score of a vehicle camera. The vehicle sensor testing system may measure noise, range, intensity, probability of detection, and other metrics for LIDAR sensors. Based on the sensor data for any sensor type, the vehicle sensor testing system may determine when sensor degradation may occur.

In one or more embodiments, the vehicle sensor testing system may include multiple testing targets for the vehicle sensors. Some testing targets may be used for sensors of different modalities, and other testing targets may be used for one sensor modality, but not another sensor modality (e.g., a LIDAR sensor may ignore a camera testing target). The testing targets may use varying designs. For example, a camera testing target may include different color patches and/or slanted edges patches. A LIDAR testing target may include alternating regions of high and low reflectivity (e.g., a zebra/referee-striped testing target). Testing targets may be combined. For example, the camera testing target with color patches may be incorporated into the LIDAR testing target with referee stripes.

In one or more embodiments, the vehicle sensor testing system may collect sensor data from multiple vehicles. When a vehicle event occurs, such as a hard deceleration (e.g., a deceleration that exceeds a threshold value), the vehicle sensor testing system may evaluate sensor data for one or more sensors of the vehicle that experienced the event to identify any data trends preceding the event. The vehicle sensor testing system may identify increasing or decreasing sensor data metrics over time that may indicate performance degradation. For example, when evaluating camera SFR data over time, the vehicle sensor testing system may identify SFR data points over time that may indicate a decrease on SFR that may be indicative of degradation. When evaluating LIDAR data over time, the vehicle sensor testing system may identify increasing noise in a particular laser channel, and the increasing noise may indicate degradation.

In one or more embodiments, the vehicle sensor testing system may compare sensor data trends from sensors of different vehicles that experience the same or similar events, and may determine data patterns indicative of future sensor degradation that may cause the occurrence of events. When the vehicle sensor testing system performs sensor testing on a vehicle at the depot, the vehicle sensor testing system may determine whether the sensor data and any prior sensor data for a respective sensor matches a data pattern that has been associated with an event. When vehicle sensor data matches a data pattern that has been associated with an event, the vehicle sensor testing system may predict that a sensor may degrade at a time in the future, and may trigger further evaluation, repair, or replacement of a sensor. The vehicle sensor testing system also may trigger communications to other vehicles in a same vehicle fleet as the vehicle whose sensor is predicted to experience degradation, and the communications may cause the fleet vehicles to drive to the depot for sensor testing.

In one or more embodiments, the vehicle sensor testing system may use minimum criteria thresholds that, when not satisfied by sensor data, may indicate that future degradation may occur. Even when vehicle sensor data satisfies a minimum criteria threshold, however, the vehicle sensor testing system may evaluate sensor data for any sensor over time to identify whether the data trends indicate an increase or decrease over time, or match any patterns that are associated with known vehicle events. When vehicle sensor data fail to satisfy a minimum criteria threshold, the vehicle sensor testing system may trigger further evaluation, repair, or replacement of a sensor.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

Referring to FIG. 1, there is shown a vehicle 102 having a sensor system 110 for a plurality of cameras, emitters, and sensors. The sensor system 110 may be connected to the vehicle 102. In this environment 100, there is shown that sensor system 110 includes sensors such as sensors 110a, 110b, 110c, and 110d. It should be noted that other sensors not shown in this figure may also be attached to the vehicle 102 and that the sensors 110a, 110b, 110c, and 110d are used for illustrative purposes. These sensors may detect objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR may include Geiger mode LIDAR, ground-based LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as far infrared imaging cameras, thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processors 132. The one or more processors 132 may control the transmission and reception of signals using the LIDAR 122, the cameras 124, the thermal sensor 126, and the radar 128. The various sensors of the sensor system 110, when calibrated correctly, should indicate a proper distance and shape of object 152.

Figure 2:
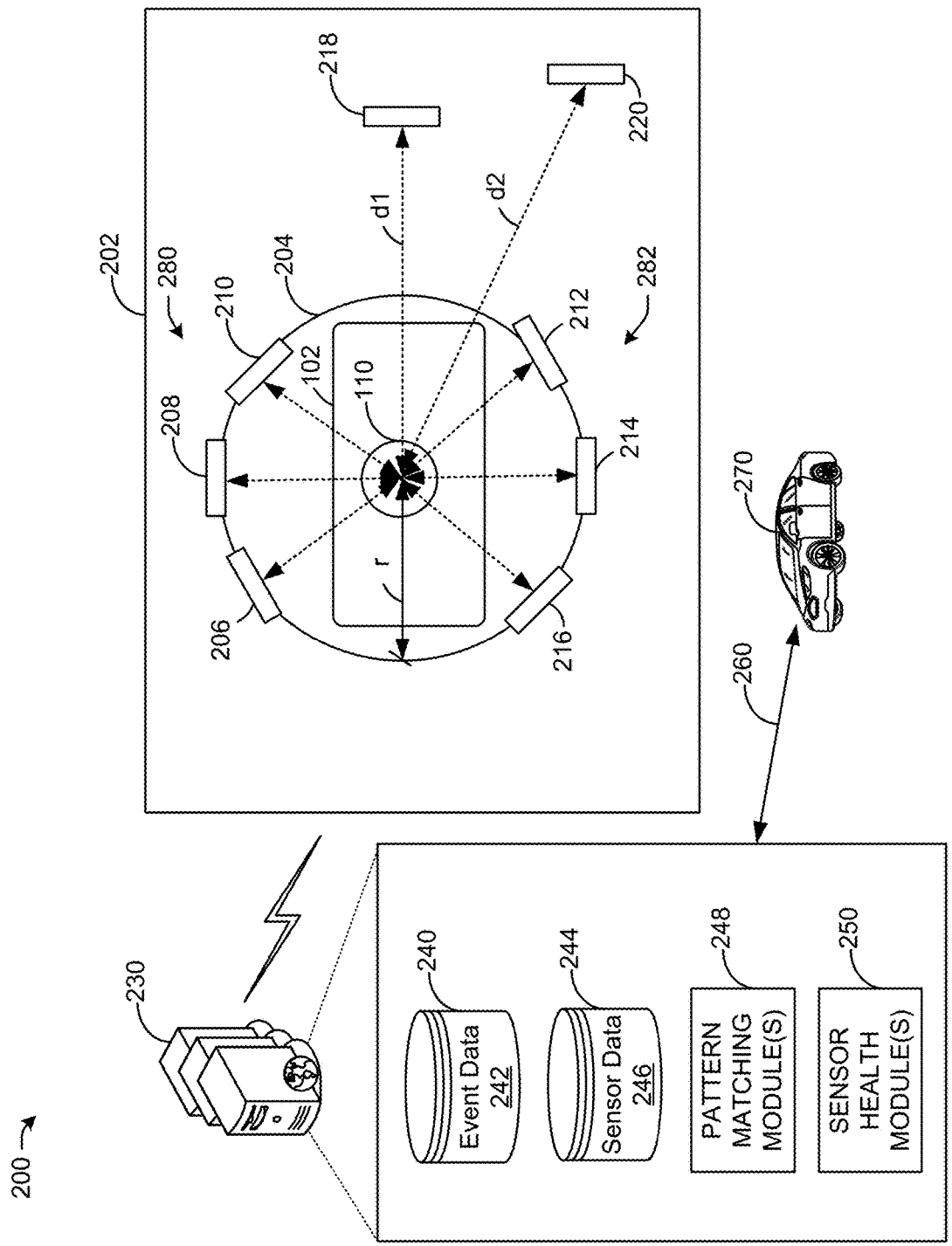
FIG. 2 depicts an illustrative system for sensor health and regression testing, in accordance with one or more example embodiments of the present disclosure.

In one or more embodiments, any of the LIDAR 122, the cameras 124, the thermal sensor 126, and the radar 128 of the sensor system 110 may degrade over time, undermining user experience (e.g., the experience of a passenger of the vehicle 102). A vehicle sensor testing system (e.g., as shown in FIG. 2) may test vehicle sensors, identify sensor data trends from sensor data of multiple vehicles, and predict when sensor degradation may occur for the vehicle 102. When an event occurs (e.g., a sudden change of direction, a significant change in acceleration, etc.), sensor data of any of the LIDAR 122, the cameras 124, the thermal sensor 126, and the radar 128 of the sensor system 110 may be analyzed to determine whether the sensor data may indicate sensor degradation associated with the event. In this manner, sensor data trends may be used to predict and prevent future vehicle events.

In one or more embodiments, the sensor system 110 optionally may include one or more additional sensors 134, such as acoustic sensors (e.g., microphones, ultrasonic sensors, etc. for detecting acoustic data for the vehicle 102) and/or other sensors that may detect objects and/or conditions of the environment in which the vehicle 102 operates (e.g., detection of sounds, objects, people, weather, and the like), allowing the vehicle 102 to operate (e.g., change speeds, direction, driving modes, etc.).

It is understood that the above descriptions are for purposes of illustration and are not meant to be limiting.

FIG. 2 depicts an illustrative system 200 for sensor health and regression testing, in accordance with one or more example embodiments of the present disclosure.

Referring to FIG. 2, the system 200 may include the vehicle 102 with the sensor system 110 of FIG. 1 (e.g., a top schematic view of the vehicle 102). The vehicle 102 may enter a sensor testing environment 202 (e.g., a depot). In particular, the vehicle 102 may enter a testing area 204 in which the vehicle 102 may be at least partially surrounded by testing targets (e.g., target 206, target 208, target 210, target 212, target 214, target 216) to test the sensors of the sensor system 110. The testing targets may test one or multiple sensors of the sensor system 110. For example, the testing targets may be positioned at a distance from the sensor system 110 (e.g., a radius r of the testing area 204, which may be 2-4 meters or another distance). A far field target 218 may be positioned at a different distance d1 (e.g., 10-15 meters, or another distance) from the sensor system 110. A long distance target 220 may be positioned at a longer distance d2 (e.g., at least 20 meters or another distance) from the sensor system 110. The different targets may be used to evaluate different sensor performance metrics as explained further herein.

Still referring to FIG. 2, the system 200 may include one or more computer devices 230 that may collect sensor data from the sensor system 110. The one or more computer devices 230 may include databases for data storage (e.g., a database 240 to store event data 242, a database 244 to store sensor data 246), and may include one or more pattern matching modules 248 (e.g., to identify sensor data patterns associated with vehicle events) and one or more sensor health modules 250 (e.g., for determining whether sensor performance data indicates performance degradation). The event data 242 may include stored events for one or more vehicles, such as significant changes in velocity, direction, acceleration, and the like. In this manner, the event data 242 may include dates and times of labeled vehicle events (e.g., associated with controlling operation and movement of an identified vehicle), velocity data, acceleration data, operational data, and the like. The event data 242 may indicate that a velocity, acceleration, change of direction, or the like exceeds a threshold value that indicates an abnormal movement or operation of a vehicle, undermining a passenger's experience. The sensor data 246 may include data for the different types of sensors of the sensor system 110, such as SFR data, dynamic range data, color measurements, blur, noise, PIQE scores, distance measurements, frequency channels, elevation, hits per target, range accuracy and precision, intensity accuracy and precision, probability of detection (e.g., detecting a target), and the like. The sensor data 246 and the event data 242 may be stored with a date, vehicle uptime, vehicle identifier, sensor serial number (e.g., to identify the specific sensor), a testing location, sensor position on the vehicle 102 (e.g., front center, stereo camera, etc.), and sensor temperature. The sensor data 246 and the event data 242 may be time-stamped to allow the one or more computer devices 230 to associate the sensor data 246 with any event. The one or more computer devices 230 may identify when a vehicle event occurred based on vehicle data indicative of vehicle operation, velocity, acceleration, and the like. For example, when vehicle acceleration is above or below a threshold value, such may indicate that a vehicle event has occurred, and the corresponding sensor data for the time preceding the vehicle event may be analyzed for matching trends.

In one or more embodiments, as the vehicle 102 drives through the testing environment 202, various scans and other tests may be performed on the vehicle sensors. The vehicle sensor tests may provide data indicative of the health of any sensor of any vehicle.

In one or more embodiments, the system 200 may identify when a sensor's data exhibits signs of possible degradation. For example, when a sensor's data does not satisfy one or more thresholds (e.g., as determined by the one or more sensor health modules 250), and/or matches sensor data trends (e.g., as determined by the one or more pattern matching modules 248 based on the sensor data 246 and the event data 242) that are indicative of possible degradation, the system 200 proactively may repair or replace sensors before sensor performance declines.

In one or more embodiments, the testing targets may allow for vehicle sensors using different modalities (e.g., camera, LIDAR, radar, thermal, etc.) to detect objects and their distances from the vehicle 102. For example, the vehicle sensor testing system may measure SFR data, dynamic range data, color measurements, blur, noise, PIQE scores, distance measurements, frequency channels, elevation, hits per target, range accuracy and precision, intensity accuracy and precision, probability of detection (e.g., detecting a target), and the like. Based on the sensor data for any sensor type, the one or more sensor health modules 250 may determine when sensor degradation may occur.

Figure 3B:
FIG. 3B depicts an illustrative example target for sensor health and regression testing, in accordance with one or more example embodiments of the present disclosure.
Figure 3A:
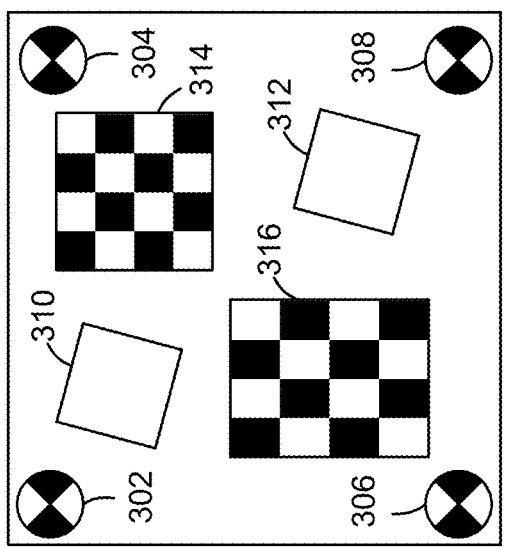
FIG. 3A depicts an illustrative example target for sensor health and regression testing, in accordance with one or more example embodiments of the present disclosure.
Figure 3C:
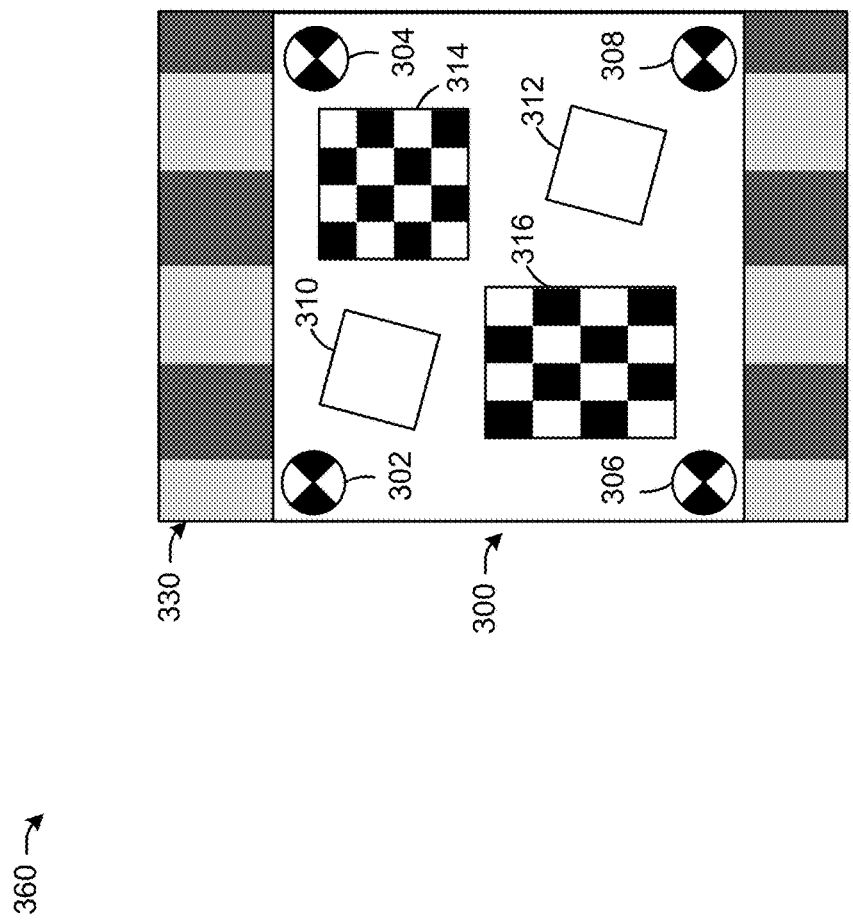
FIG. 3C depicts an illustrative example target for sensor health and regression testing, in accordance with one or more example embodiments of the present disclosure.

In one or more embodiments, the sensor testing targets may provide different types of data. For example, the far field target 218 may be used to detect SFR, dynamic range, and color accuracy (e.g., using patches as shown in FIG. 3A), PIQE, a natural image quality evaluator (NIQE), brisque, Laplacian, variance, and the like for cameras (e.g., the cameras 124 of FIG. 1). A LIDAR testing target may include alternating regions of high and low reflectivity (e.g., a zebra/referee-striped testing target). Testing targets may be combined. For example, the camera testing target with patches may be incorporated into the LIDAR testing target with referee stripes. Example testing targets are shown in FIGS. 3A-3C. The testing targets may be detectable by one or multiple sensors based on their placement and relative location to the respective sensors of the vehicle 102. For example, the target 206 may be detectable by the sensors 110a and 110d of FIG. 1. The target 210 may be detectable by the sensors 110a, 110b, and 110c of FIG. 1. Not every target may be detectable by every sensor (e.g., because some targets may be out of the field of view or range of a sensor). The targets may include portions of black, white, and grey colors (e.g., 5% black, 80% grey, 95% white, etc.). The targets may vary in size and may be positioned off of the floor (e.g., using frames and retractable casters, and the like). The targets may be made of wood or other materials. As shown in FIG. 2, six targets may be positioned at the radius r from the sensor system 110, and may be stationary targets. Some targets may be positioned on one side 280 of the vehicle 102, and other targets may be positioned on an opposite side 282 of the vehicle 102.

In one or more embodiments, the one or more computers 230 may collect the sensor data 246 from multiple vehicles. When a vehicle event occurs, the one or more computers 230 may evaluate the sensor data 246 for one or more sensors of the vehicle that experienced the event to identify any data trends preceding the event. The one or more computers 230 may identify increasing or decreasing sensor data metrics over time that may indicate performance degradation. For example, when evaluating camera SFR data over time, the one or more computers 230 may identify SFR data points over time that may indicate a decrease on SFR that may be indicative of degradation. When evaluating LIDAR data over time, the one or more computers 230 may identify increasing noise in a particular channel, and the increasing noise may indicate degradation.

In one or more embodiments, the one or more pattern matching modules 248 may compare sensor data trends from sensors of different vehicles that experience the same or similar events, and may determine data patterns indicative of future sensor degradation that may cause the occurrence of events. When the system 200 performs sensor testing on the vehicle 102, the one or more pattern matching modules 248 may determine whether the sensor data 246 matches a data pattern that has been associated with an event. When the sensor data 246 matches a data pattern that has been associated with an event, the one or more sensor health modules 250 may predict that a sensor may degrade at a time in the future, and may trigger further evaluation, repair, or replacement of a sensor. The one or more computers 230 also may trigger communications 260 to other vehicles 270 in a same vehicle fleet as the vehicle whose sensor is predicted to experience degradation, and the communications may cause the fleet vehicles 270 to drive to the testing environment 202 for sensor testing.

In one or more embodiments, the one or more sensor health modules 250 may use minimum criteria thresholds that, when not satisfied by the sensor data 246, may indicate that future degradation may occur. Even when vehicle sensor data satisfies a minimum criteria threshold, however, the one or more pattern matching modules 248 may evaluate the sensor data 246 for any sensor over time to identify whether the data trends indicate an increase or decrease over time, or match any patterns that are associated with known vehicle events. When vehicle sensor data fail to satisfy a minimum criteria threshold, the one or more computers 230 may trigger further evaluation, repair, or replacement of a sensor.

It is understood that the above descriptions are for purposes of illustration and are not meant to be limiting.

FIG. 3A depicts an illustrative example target 300 for sensor health and regression testing, in accordance with one or more example embodiments of the present disclosure.

Referring to FIG. 3A, the target 300 may be used as any of the target 206, the target 208, the target 210, the target 212, the target 214, the target 216, the far field target 218, and/or the long distance target 220 of FIG. 2. The target 300 may be used to test camera data (e.g., the cameras 124 of FIG. 1), and may include image objects (e.g., object 302, object 304, object 306, object 308, object 310, object 312), which may have one or multiple colors. The target 300 may include arrays of patches (e.g., patches 314, patches 316), which may include multiple patches of different colors and/or sizes. The target 300 may be used to detect SFR, dynamic range, color accuracy, NIQE, PIQE, variance of the Laplacian, blur, noise, and the like for vehicle cameras. For example, a higher PIQE score indicates worse performance than a lower PIQE score, and a lower variance of the Laplacian indicates a less sharp image. The target 300 may be 40-50 inches in width and 45-55 inches tall.

It is understood that the above descriptions are for purposes of illustration and are not meant to be limiting.

FIG. 3B depicts an illustrative example target 330 for sensor health and regression testing, in accordance with one or more example embodiments of the present disclosure.

Referring to FIG. 3B, the target 330 may be used as any of the target 206, the target 208, the target 210, the target 212, the target 214, the target 216, the far field target 218, and/or the long distance target 220 of FIG. 2. The target 330 may be a zebra or referee style target with a striped pattern (e.g., black and white stripes or other colors). The stripes (e.g., of 4-8 inches width or another width) may be formed with reflective sheeting (e.g., diamond grade retro or other sheeting), paint, and/or other materials. The target 330 may be used for LIDAR sensor testing, and may be 30-40 inches wide by 70-90 inches tall.

It is understood that the above descriptions are for purposes of illustration and are not meant to be limiting.

FIG. 3C depicts an illustrative example target 360 for sensor health and regression testing, in accordance with one or more example embodiments of the present disclosure.

Referring to FIG. 3C, the target 360 may combine the target 300 of FIG. 3A and the target 330 of FIG. 3B. In particular, the target 330 of FIG. 3A may overlay the target 330 of FIG. 3B. The LIDAR analysis by the one or more computers 230 of FIG. 2 may ignore the target 330 and rely on the target 330.

In one or more embodiments, any of the testing targets shown in FIG. 3A-3C may include patches, objects, images, and the like, and/or may exhibit sounds, temperatures, and the like that may be detected by any of the sensors of the sensor system 110 of FIG. 1. The data from any of the sensors of the sensor system 110 may be used to control operation of the vehicle 102 of FIG. 1 (e.g., based on the detection of objects, temperatures, driving conditions, and the like). In one or more embodiments, the vehicle sensor testing system may identify when a sensor's data exhibits signs of possible degradation. For example, when a sensor's data does not satisfy one or more thresholds, and/or matches sensor data trends (e.g., based on a corpus of sensor data from one or more vehicles over time) that are indicative of possible degradation, the vehicle sensor testing system proactively may repair or replace sensors before sensor performance declines.

It is understood that the above descriptions are for purposes of illustration and are not meant to be limiting.

FIG. 4A depicts an illustrative example graphical output 400 for sensor health and regression testing, in accordance with one or more example embodiments of the present disclosure.

Referring to FIG. 4A, a device 402 may display an interface 404 with the graphical output 400, which may refer to SFR data for vehicle cameras (e.g., the cameras 124 of FIG. 1). The vehicle cameras may include sensor 1 (e.g., the sensor 110a of FIG. 1), sensor 2 (e.g., the sensor 110b of FIG. 1), and sensor 3 (e.g., the sensor 110d of FIG. 1). As shown, the SFR data of the cameras may represent a decreasing SFR for the sensors over time. The decreasing SFR may trigger a response (e.g., when the SFR drops below a threshold SFR, or when the decreasing SFR matches a trend that preceded a vehicle event for the same vehicle or another vehicle).

It is understood that the above descriptions are for purposes of illustration and are not meant to be limiting.

Figure 4B:
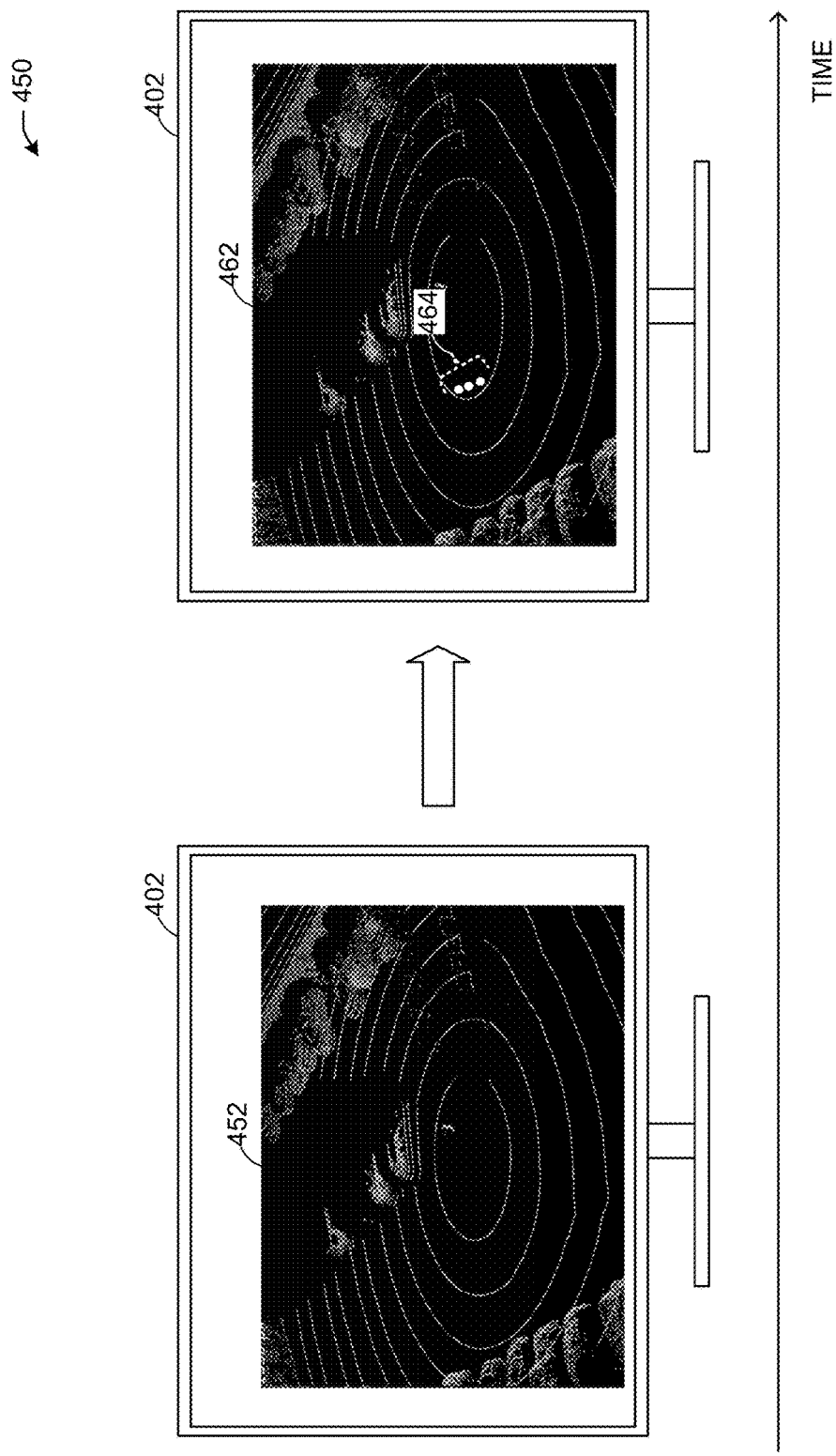
FIG. 4B depicts an illustrative example output for sensor health and regression testing, in accordance with one or more example embodiments of the present disclosure.

FIG. 4B depicts an illustrative example output 450 for sensor health and regression testing, in accordance with one or more example embodiments of the present disclosure.

Referring to FIG. 4B, the output 450 may include multiple LIDAR data points at different times. The device 402 may display first LIDAR data 452 at a first time, and second LIDAR data 462 at a later time. As shown, the second LIDAR data 462 may indicate some noise 464 based on LIDAR signal returns. The noise 464 may result in LIDAR sensor performance (e.g., performance of the LIDAR 122 of FIG. 1) not meeting a performance threshold (e.g., noise exceeding a threshold noise), and may trigger a response when the LIDAR data fail to meet performance criteria or matches a trend that preceded a vehicle event for the same vehicle or another vehicle.

Figure 5:
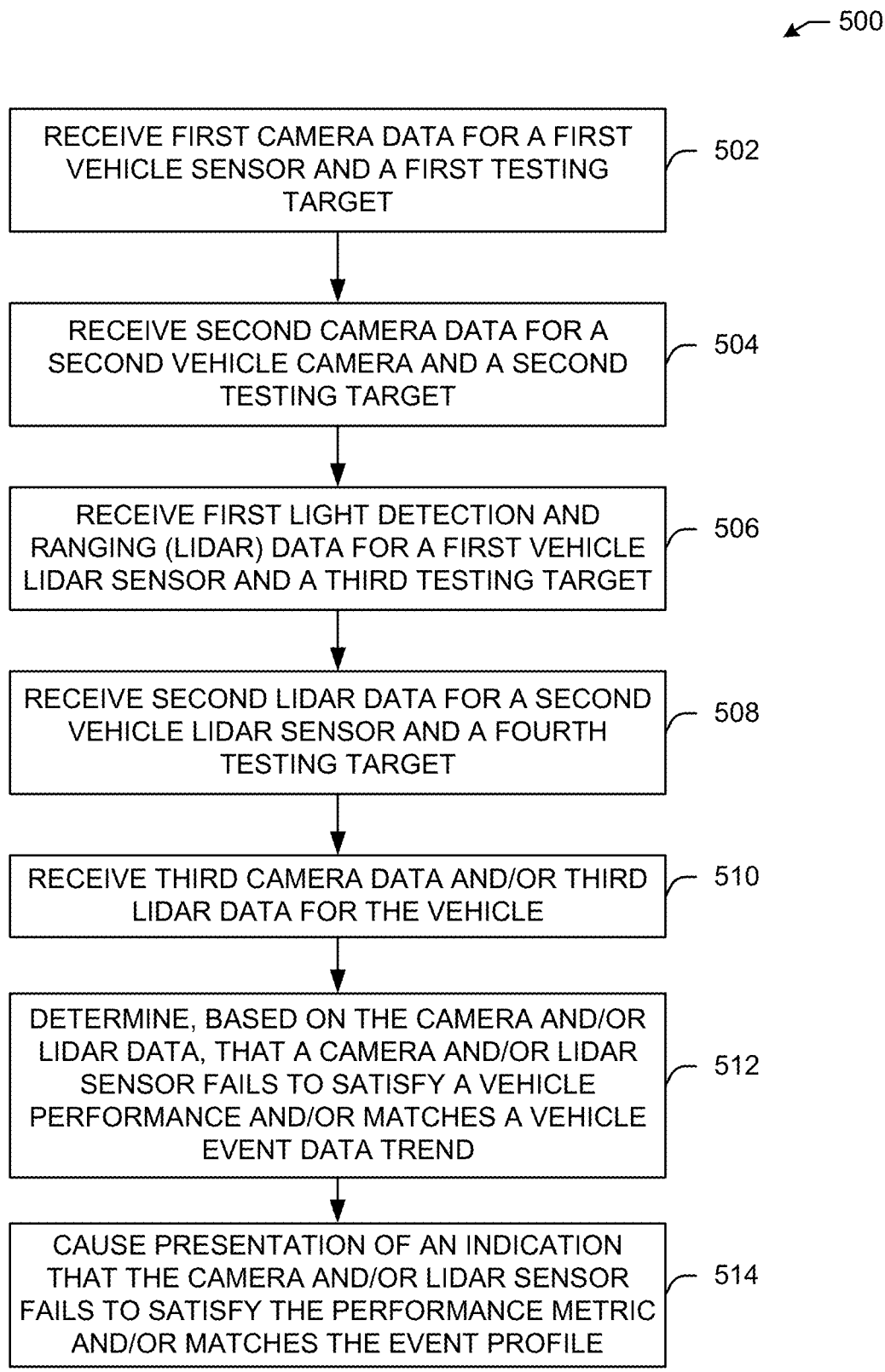
FIG. 5 illustrates a flow diagram of a process for sensor health and regression testing, in accordance with one or more example embodiments of the present disclosure.

FIG. 5 illustrates a flow diagram of a process 500 for sensor health and regression testing, in accordance with one or more example embodiments of the present disclosure.

At block 502, a device (e.g., or system, such as the system 200 of FIG. 2) may receive first camera data associated with a first camera of a vehicle (e.g., the vehicle 102 of FIG. 1). The system may include a first plurality of sensor testing targets (e.g., targets 206, 208, and 210) positioned on a first side of the vehicle at a first distance from the vehicle (e.g., side 280 at radius r of FIG. 2). The system may include a second plurality of sensor testing targets (e.g., targets 212, 214, and 216) positioned on a first side of the vehicle at a first distance from the vehicle (e.g., side 282 at radius r of FIG. 2). The first camera data may be image data for one or more sensor testing targets of the first plurality of sensor testing targets and/or the second plurality of sensor testing targets. For example, the first camera data may include data used to determine SFR, dynamic range, and color accuracy of a vehicle camera, and image quality evaluator scores of a vehicle camera.

At block 504, the device may receive second camera data associated with a second camera of the vehicle, and based on image data captured for a sensor testing target of the second plurality of sensor testing targets. For example, the second camera data may include data used to determine SFR, dynamic range, and color accuracy of a vehicle camera, and image quality evaluator scores of a vehicle camera. The first and second testing targets may be at a same distance from the vehicle (e.g., the radius r of FIG. 2), and may be on opposite sides of the vehicle (e.g., sides 280 and 282 of FIG. 2).

At block 506, the device may receive first LIDAR data for a first LIDAR sensor of the vehicle. The first LIDAR data may be detected based on the reflection of emitted light from vehicle LIDAR, and the reflection off of a third sensor testing target (e.g., of the first plurality of sensor testing targets) may be used to determine LIDAR data metrics such as noise, range, intensity, probability of detection, and other metrics.

At block 508, the device may receive second LIDAR data for a second LIDAR sensor of the vehicle. The second LIDAR data may be detected based on the reflection of emitted light from vehicle LIDAR, and the reflection off of a fourth sensor testing target (e.g., of the second plurality of sensor testing targets) may be used to determine LIDAR data such as noise, range, intensity, probability of detection, and other metrics.

At block 510, the device may receive third camera data for a third camera of the vehicle and/or may receive third LIDAR data for a third LIDAR sensor of the vehicle. The third camera data and/or LIDAR data may be based on a fifth sensor testing target and/or sixth sensor testing target (e.g., the far field target 218 and/or the long distance target 220 of FIG. 2). The fifth and/or sixth sensor testing target may be positioned at respective distances longer than the first distance (e.g., d1 or d2 of FIG. 2). Any of the sensor testing targets of blocks 502-510 may be used by one or multiple sensors of the vehicle to capture sensor data and determine sensor performances. The sensor testing targets of blocks 502-510 may include any of the testing targets of FIG. 2-FIG. 3C.

At block 512, the device may determine, based on any of the camera and/or LIDAR data of blocks 502-510, that a sensor of the vehicle has failed to satisfy a vehicle performance metric and/or matches a data trend associated with a vehicle event. For example, the device may measure the SFR, dynamic range, and color accuracy of a vehicle camera, and may determine image quality evaluator scores of a vehicle camera, and when such performance metrics are above or below a threshold metric/score, the sensor whose data is above or below the threshold may be identified as failing to satisfy the vehicle performance metric. The device may measure noise, range, intensity, probability of detection, and other metrics for LIDAR sensors. When a LIDAR sensor's noise exceeds a threshold noise, the probability of detection is below a threshold probability, the range is below a threshold range, or the intensity is below a threshold intensity, the LIDAR sensor may be identified as failing to satisfy the vehicle performance metric. Any one or multiple sensors may be identified as failing to satisfy the vehicle performance metric. Alternatively or in addition, the device may identify that a trend (e.g., an increase or decrease) in the camera and/or LIDAR data of blocks 502-510 may match trends that have been associated with vehicle events (e.g., sudden stops, changes in direction, etc.), and the matching trend may indicate that a sensor is degrading and may result in a same or similar vehicle event.

At block 514, the device may cause presentation of an indication that the cameras and/or LIDAR sensors of the vehicle are failing to satisfy the vehicle performance metric and/or match a vehicle event trend. For example, the outputs presented in FIGS. 4A and 4B may represent the outputs of camera data and LIDAR data, respectively, that either match an event trend or fail to satisfy a performance metric. Alternatively or in addition, the device may send or present an indication (e.g., the communications 260 of FIG. 2) to other vehicles, and the indication may cause the other vehicles to drive to a testing environment for sensor testing.

It is understood that the above descriptions are for purposes of illustration and are not meant to be limiting.

Figure 6:
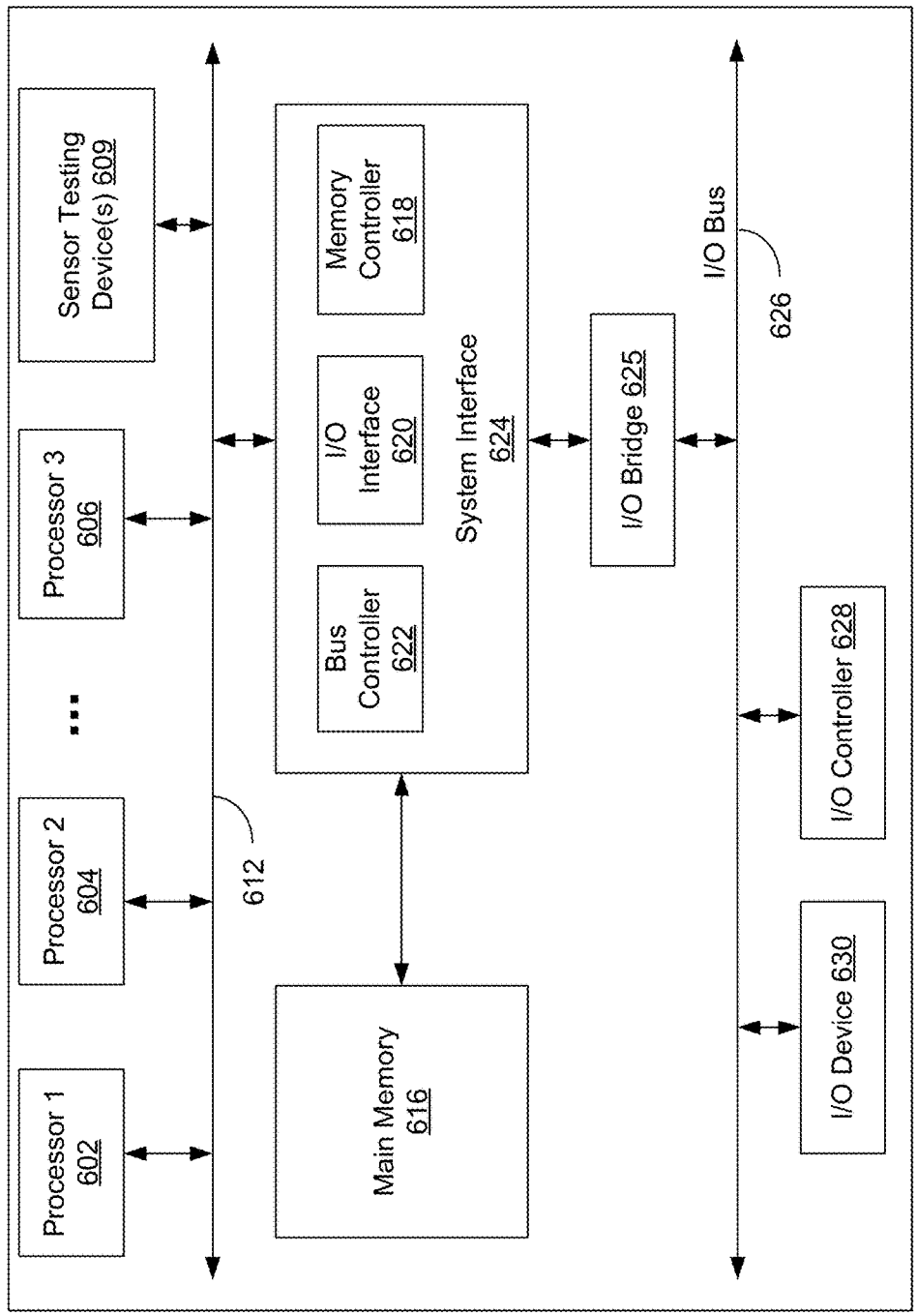
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 5 may represent one or more processors 132 of FIG. 1. The computer system (system) includes one or more processors 602-606. Processors 602-606 may include one or more internal levels of cache (not shown) and a bus controller (e.g., bus controller 622) or bus interface (e.g., I/O interface 620) unit to direct interaction with the processor bus 612. One or more sensor testing devices 609 (e.g., the one or more pattern matching modules 248 and/or the one or more sensor health modules 250 of FIG. 2) may also be in communication with the Processors 602-606 and may be connected to the processor bus 612.

Processor bus 612, also known as the host bus or the front side bus, may be used to couple the processors 602-606 and/or the one or more sensor testing devices 609 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606 and/or the one or more sensor testing devices 609. Another type of user input device includes cursor control, such as a mouse, a trackball, or cursor direction keys for communicating direction information and command selections to the processors 602-606 and/or the one or more sensor testing devices 609 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606 and/or the one or more sensor testing devices 609. Main memory 616 also may be used for storing temporary variables or other intermediate information during execution of instructions by the processors 602-606 and/or the one or more sensor testing devices 609. System 600 may include read-only memory (ROM) and/or other static storage device coupled to the processor bus 612 for storing static information and instructions for the processors 602-606 and/or the one or more sensor testing devices 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 and/or the one or more sensor testing devices 609 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A vehicle sensor testing system, comprising:
a first plurality of sensor testing targets positioned on a first side of a vehicle at a first distance from the vehicle;
a second plurality of sensor testing targets positioned on a second side of the vehicle at the first distance from the vehicle, the second side opposite the first side;
a first sensor testing target positioned at a second distance from the vehicle, the second distance further from the vehicle than the first distance,
a sixth sensor testing target positioned at a third distance from the vehicle, the third distance different than the first distance and the second distance; and
wherein the first plurality of sensor testing targets comprises a second sensor testing target associated with first camera data for the vehicle and a third sensor testing target associated with first light detection and ranging (LIDAR) data for the vehicle,
wherein the second plurality of sensor testing targets comprises a fourth sensor testing target associated with second camera data for the vehicle and a fifth sensor testing target associated with second LIDAR data for the vehicle, and
wherein the first sensor testing target is associated with at least one of third camera data for the vehicle or third LIDAR data for the vehicle.

2. The vehicle sensor testing system of claim 1, wherein the first plurality of sensor testing targets further comprises a sixth sensor testing target, and wherein the second plurality of sensor testing targets comprises a seventh sensor testing target.

3. The vehicle sensor testing system of claim 1, wherein the first sensor testing target comprises an array of patches.

4. The vehicle sensor testing system of claim 1, wherein the first sensor testing target comprises a first stripe of a first color and a second stripe of a second color.

5. The vehicle sensor testing system of claim 1, further comprising at least one processor configured to:
receive the first camera data;
determine that the first camera data fail to satisfy a camera data performance metric; and
cause presentation of an indication that the first camera data fail to satisfy the camera data performance metric.

6. The vehicle sensor testing system of claim 1, further comprising at least one processor configured to:
receive the first LIDAR data;
determine that the first LIDAR data fail to satisfy a LIDAR data performance metric; and
cause presentation of an indication that the first LIDAR data fail to satisfy the LIDAR data performance metric.

7. The vehicle sensor testing system of claim 1, further comprising at least one processor configured to:
receive sensor data comprising the first camera data and the first LIDAR data;
determine an event associated with operation of the vehicle;
determine that at least one of the first LIDAR data or the first camera data matches a sensor data profile associated with the event; and
cause presentation of an indication that at least one of the first LIDAR data or the first camera data matches the sensor data profile associated with the event.

8. The vehicle sensor testing system of claim 1, wherein:
the first camera data is associated with a first camera of the vehicle,
the second camera data is associated with a second camera of the vehicle,
the first LID AR data is associated with a first LID AR sensor of the vehicle, and
the second LID AR data is associated with a second LID AR sensor of the vehicle.

9. The vehicle sensor testing system of claim 1, wherein the first plurality of sensor testing targets are associated with at least one of:
radar data for the vehicle, thermal data for the vehicle, or acoustic data for the vehicle.

10. A vehicle sensor testing system, comprising:
a first plurality of sensor testing targets positioned on a first side of a vehicle at a first distance from the vehicle;
a second plurality of sensor testing targets positioned on a second side of the vehicle at the first distance from the vehicle, the second side opposite the first side;
a first sensor testing target positioned at a second distance from the vehicle, the second distance further from the vehicle than the first distance
a sixth sensor testing target positioned at a third distance from the vehicle, the third distance different than the first distance and the second distance; and,
wherein the first plurality of sensor testing targets comprises a second sensor testing target associated with first camera data for the vehicle and a third sensor testing target associated with first light detection and ranging (LIDAR) data for the vehicle,
wherein the second plurality of sensor testing targets comprises a fourth sensor testing target associated with second camera data for the vehicle and a fifth sensor testing target associated with second LIDAR data for the vehicle, and
wherein the first sensor testing target is associated with at least one of third camera data for the vehicle or third LIDAR data for the vehicle, and
at least one processor coupled to memory, the at least one processor configured to determine, based on at least one of the first camera data, the second camera data, the third camera data, the first LIDAR data, the second LIDAR data, or the third LIDAR data, that a sensor of the vehicle fails to satisfy a vehicle sensor performance metric.

11. The vehicle sensor testing system of claim 10, wherein the first plurality of sensor testing targets further comprises a sixth sensor testing target, and wherein the second plurality of sensor testing targets comprises a seventh sensor testing target.

12. The vehicle sensor testing system of claim 10, wherein the first sensor testing target comprises an array of patches.

13. The vehicle sensor testing system of claim 10, wherein the first sensor testing target comprises a first stripe of a first color and a second stripe of a second color.

14. The vehicle sensor testing system of claim 10, wherein the vehicle sensor performance metric is a camera data performance metric, and wherein to determine that the vehicle sensor fails to satisfy the vehicle sensor performance metric comprises the at least one processor being further configured to:
receive the first camera data; and
determine that the first camera data fail to satisfy the camera data performance metric, wherein the at least one processor is further configured to cause presentation of an indication that the first camera data fail to satisfy the camera data performance metric.

15. The vehicle sensor testing system of claim 10, wherein the vehicle sensor performance metric is a LIDAR data performance metric, and wherein to determine that the vehicle sensor fails to satisfy the vehicle sensor performance metric comprises the at least one processor being further configured to:
receive the first LIDAR data; and
determine that the first LIDAR data fail to satisfy the LIDAR data performance metric, wherein the at least one processor is further configured to cause presentation of an indication that the first LIDAR data fail to satisfy the LIDAR data performance metric.

16. The vehicle sensor testing system of claim 10, wherein the at least one processor configured to:
receive sensor data comprising the first camera data and the first LIDAR data;
determine an event associated with operation of the vehicle;
determine that at least one of the first LIDAR data or the first camera data matches a sensor data profile associated with the event, wherein to determine that the vehicle sensor fails to satisfy the vehicle sensor performance metric comprises the determination that at least one of the first LIDAR data or the first camera data matches the sensor data profile associated with the event; and
cause presentation of an indication that at least one of the first LIDAR data or the first camera data matches the sensor data profile associated with the event.

17. A method for vehicle sensor testing, the method comprising:
receiving, by at least one processor of a device, first camera data associated with a first camera of a vehicle and a first sensor testing target, wherein a first plurality of sensor testing targets comprising the first sensor testing target are positioned on a first side of a vehicle at a first distance from the vehicle;
receiving, by the at least one processor, second camera data associated with a second camera of the vehicle and a second sensor testing target, wherein a second plurality of sensor testing targets comprising the second sensor testing target are positioned on a second side of the vehicle at the first distance from the vehicle, the second side opposite the first side;
receiving, by the at least one processor, first light detection and ranging (LIDAR) data associated with a first LIDAR sensor of the vehicle and a third sensor testing target, wherein the first plurality of sensor testing targets comprises the third sensor testing target;
receiving, by the at least one processor, second LIDAR data associated with a second LIDAR sensor of the vehicle and a fourth sensor testing target, wherein the second plurality of sensor testing targets comprises the fourth sensor testing target;
receiving, by the at least one processor, at least one of third camera data associated with a third camera of the vehicle or third LIDAR data associated with a third LIDAR sensor of the vehicle, wherein the at least one of the third camera data or the third LIDAR data are associated with a fifth sensor testing target positioned at a second distance from the vehicle, the second distance greater than the first distance;
receiving, by the at least one processor, at least one of fourth camera data associated with a fourth camera of the vehicle or fourth LIDAR data associated with a fourth LIDAR sensor of the vehicle, wherein the at least one of the fourth camera data or the fourth LIDAR data are associated with a sixth sensor testing target positioned at a third distance from the vehicle, the third distance different than the first distance and the second distance; and
determining, by the at least one processor, based on at least one of the first camera data, the second camera data, the third camera data, the first LIDAR data, the second LIDAR data, or the third LIDAR data, that a sensor of the vehicle fails to satisfy a vehicle sensor performance metric; and
cause presentation, by the at least one processor, that that the sensor of the vehicle fails to satisfy the vehicle sensor performance metric.

18. The method for vehicle sensor testing of claim 17 further comprising:
determining an event associated with operation of the vehicle;
determining that at least one of the first LIDAR data or the first camera data matches a sensor data profile associated with the event; and
causing presentation of an indication that at least one of the first LIDAR data or the first camera data matches the sensor data profile associated with the event.

* * * * *